United States Patent [19]

Wilger

[11] Patent Number: 4,709,857

[45] Date of Patent: Dec. 1, 1987

[54] VARIABLE HEIGHT FIELD SPRAYER FRAME

[76] Inventor: Wilfed H. Wilger, 219 Ball Crescent, Saskatoon, Saskatchewan, Canada, S7K 6E1

[21] Appl. No.: 932,883

[22] Filed: Nov. 20, 1986

[51] Int. Cl.$^4$ .............................................. B05B 1/20
[52] U.S. Cl. .................................... 239/164; 239/167
[58] Field of Search ................ 239/167, 166, 168, 164

[56] References Cited

U.S. PATENT DOCUMENTS

| | | | |
|---|---|---|---|
| 2,657,949 | 11/1953 | Morrison | 239/167 |
| 3,011,724 | 12/1961 | Eastep | 239/164 |
| 4,044,952 | 8/1977 | Williams et al. | 239/168 |
| 4,372,492 | 2/1983 | Blumenshire | 239/168 |

FOREIGN PATENT DOCUMENTS 824514 10/1969 Canada ................................ 239/167

Primary Examiner—Andres Kashnikow
Assistant Examiner—Karen B. Merritt
Attorney, Agent, or Firm—D. Ron Morrison

[57] ABSTRACT

A lightweight, variable height, agricultural field sprayer frame has two laterally extending boom sections which fold to narrow width for transportation the booms can be vertically raised or lowered to adjust their spraying height so that they can be used for pre-emergent or crop height spraying. The folding and unfolding of the booms between transport and spraying positions is power controlled from a driver's seat or cab as is the raising and lowering of the booms. In a modification of the invention, an additional wing section extends from each boom section and raises and lowers with the boom section as well as folding for transport.

5 Claims, 10 Drawing Figures

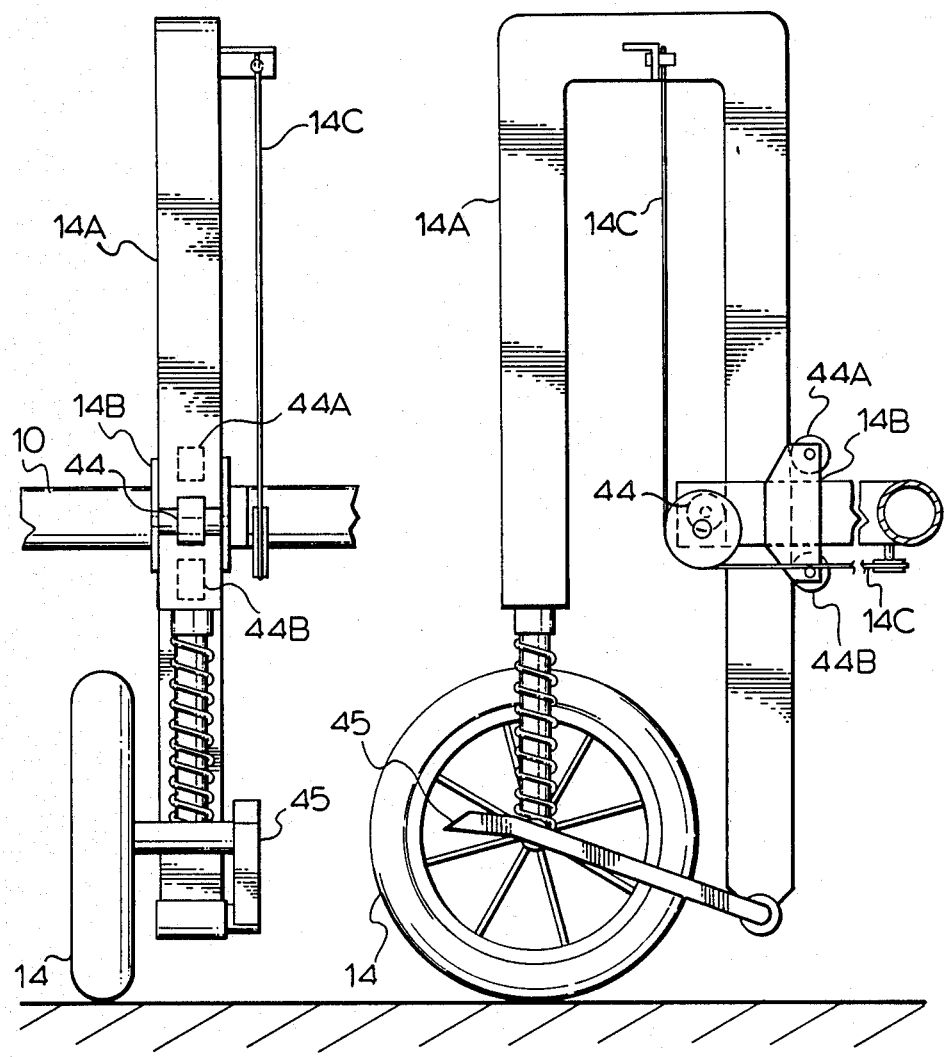

VARIABLE HEIGHT FIELD SPRAYER FRAME

This invention relates to agricultural field sprayers, and more particularly to an agricultural field sprayer frame of lightweight construction that is foldable to a narrow width transportation mode for passage through gates and along roadways, and extendable to a broad width working mode for wide swath application of field spray, the conversion from each mode to the other being operable from the operator's seat of the motive power source used to draw the sprayer.

Agricultural field sprayers are now required to cover swaths of more than 30 meters (substantially 100 feet and more), and still be readily and quickly moved through farm gates and along roadways between spraying conditions, despite the width in their working modes. The length of the spray booms necessary to achieve such swaths requires either multiple mobile supports for the booms, eg. wheels, or booms of considerable structural strength to maintain rigidity over long spans. The present invention provides a lightweight frame for a field sprayer, capable of supporting the spray nozzles and requisite spray tubes of the sprayer, and also capable of folding from a working mode, having a width transverse to the direction of travel of up to substantially 30 meters or more, to a transport mode suitable for passage along roads and highways. Numerous novel features of construction are included in the frame to achieve these desiderata, and these features are to be detailed hereinafter.

The invention thus comprises a frame for a field sprayer that is foldable to a narrow width transportation mode and extendable to a broad width working mode for wide swath application of spray from nozzles mounted thereon, the folding and extension of the frame being operable from a position at the controls of a motive power source serving to pull the sprayer, said frame comprising:

(a) a vertical planar rectangular guide frame mounted rigidly at the back of said motive power source, (b) a movable boom hitch bracket mounted in said guide frame and adapted to move only vertically but freely therein, (c) a power source adapted to move and position said boom hitch bracket in said guide frame, operable from the controls of said motive power source, (d) a boom hitch rigidly attached to said boom hitch bracket, adapted to move vertically with said bracket and to support and pull the inner ends of elongated boom sections of the sprayer frame, (e) two universal hinges mounted on said boom hitch, each adapted to pivot on a common vertical axis and each adapted to attach, through separate pivots on horizontal axes, to a respective inner end of an elongated boom section, (f) two elongated main boom sections, each attached by its inner end to a respective one of said universal hinges to pivot in a horizontal plane around the vertical axis of its hinge and to pivot in a vertical plane around the horizontal axis of its hinge, (g) two wheel mount brackets, each rigidly fastened to a respective boom section near the outer end thereof, each having a distal end section hinged thereto on a vertical axis, (h) two wheel support frames, each associated with a respective wheel mount bracket, moveably mounted in the hinged distal end section of its respective bracket, and held in vertical relative position with reference thereto by first taut cable means having one end fastened to a fixed point by the bottom of said guide frame, said cable means passing over pulley means to extend past the associated universal hinge, along the associated boom section, wheel mount bracket, and upwardly to the associated wheel support frame to which its distal end is fastened near the top thereof, above the level of the boom section, (i) wheel means each with an axle in the base of a respective wheel support frame, maintaining the wheel means aligned with the support frame, (j) power operated wheel pivoting means pivotally connected between each wheel support frame and associated boom section and adapted to pivot the associated wheel and support frame between positions respectively parallel to and normal to the boom section on the hinge axis of the hinged distal end section of the associated wheel mount bracket, (k) a rigid inverted U-shaped member, pivoted at its lower extremities on a horizotal axis which is positioned parallel to said planar guide frame at an elevation proximate the lowest operating level of said boom hitch and proximate the mid-point of the length of said motive power source, said member being adapted to pivot so that its upper extremity oscillates between a forward position proximate the front of said motive power source and a rearmost position approximately vertically above said boom hitch, (l) power means to pivot said U-shaped member between said forward and rearmost positions, and (m) an elongated rigid brace member associated with each of said elongated boom sections, each brace member extending from a respective point of attachment of its forward end near the upper extremity of said U-shaped member to a resective point of attachment of its distal end near the outer end of its associated boom section, said forward end being longitudinally moveably attached to said U-shaped member and adapted to releaseably latch relative to its point of attachment, said distal end being attached to said boom section by means adapted to permit movement of said distal end along a portion of the length of said boom section and to latch it releasably at the outermost extremity of said movement.

The invention further comprises a frame for a field sprayer as aforesaid and further including:

(a) two elongated outer boom sections, each pivotally attached by its inner end to the outer end of a respective one of said main boom sections by a respective four bar linkage mechanism adapted to pivot its associated outer boom section through 180 degrees between a position in contiguous direct alignment with its associated main boom section and a position parallel to and adjacent the associated main boom section, (b) two outer boom wheel mount brackets, each rigidly fastened to a respective outer boom section near the outer end thereof, (c) two outer boom wheel support frames, each associated with a respective wheel mount bracket on an outer boom section, moveably mounted for vertical movement with respect thereto and held in vertical relative position with reference thereto by second taut cable means, said second cable means having one end fastened to said first taut cable means adjacent its respective main boom section and passing over pulley means to extend along said main boom section, past said four bar linkage mechanism, along said outer boom section and wheel mount bracket, and upwardly to the associated wheel support frame to which its distal end is fastened near the top thereof, above the level of the outer boom section, (d) wheel means each with an axle in the base of a respective one of said outer boom wheel support frames, and (e) two transport brackets, each securely fastened to a respective main boom section and adapted to engage under the associated wheel support frame of the corresponding outer boom section when said section is adjacent and parallel to said main boom section in its lowermost position, and to raise the wheel means of said associated wheel support frame clear of the ground when said booms are raised on the wheel support frames by raising said boom hitch bracket.

The invention will be more readily understood from the following description thereof with reference to the accompanying drawings illustrating the more comprehensive form of the invention described above in which:

FIGS. 9 and 10 are front and side views of a wheel, wheel support frame, and wheel mount bracket of a left outer boom section as in FIG. 1.

Figure 1:
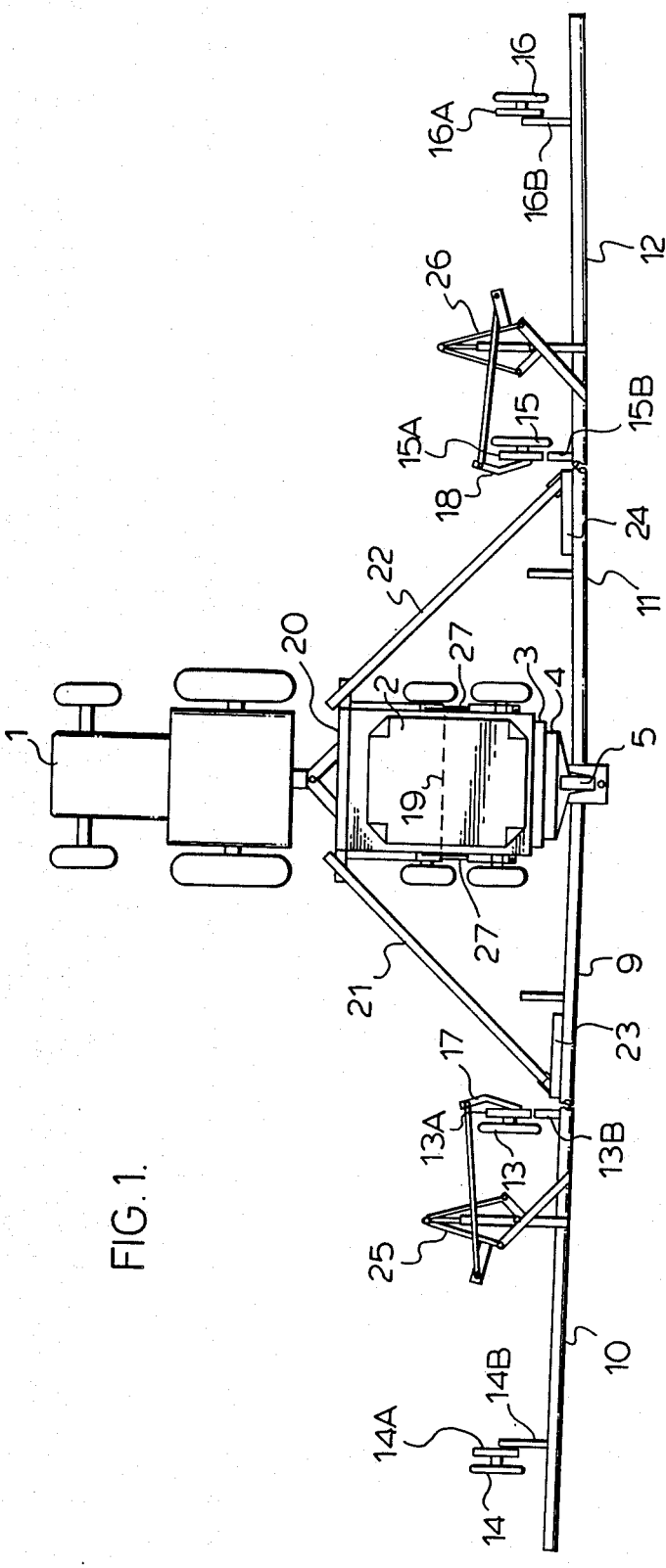
FIG. 1 is a schematic plan view of the major parts of an embodiment of the invention with a four section boom deployed in the working mode or extended in field position.
Figure 2:
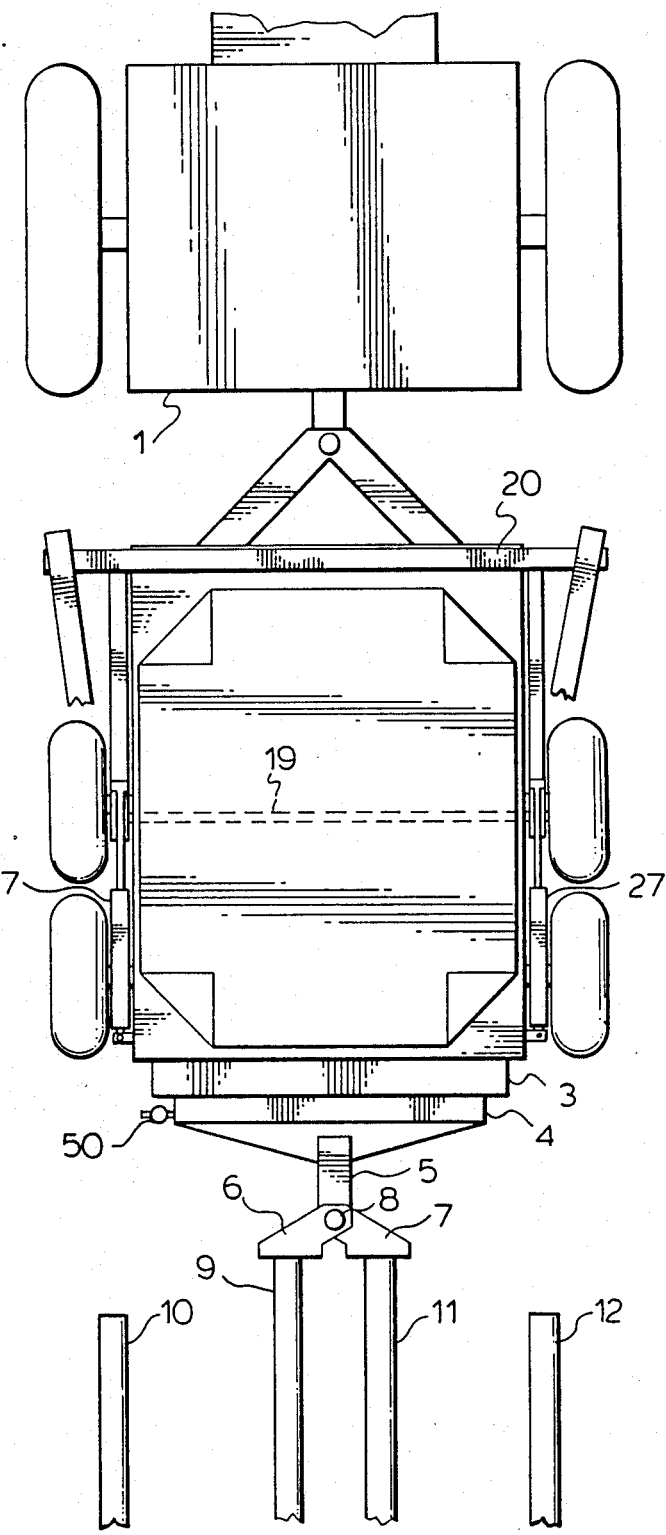
FIG. 2 is a schematic plan view of the motive power source of FIG. 1 showing more detail of a universal hinge connection between the power source and the boom, the latter being only partly shown and, in this figure, in the folded transportation mode or transport position.

Referring now to the details of the drawings, in which like numerals are used to refer to corresponding parts in the various figures, in FIG. 1 a motive power source is shown as a tractor drawn tank trailer, although a tank truck with provision for auxiliary hydraulic power source could be used in lieu thereof. As shown, a tractor 1 is hitched to draw and to supply hydraulic power to a tank trailer 2, the hydraulic power being controllable from the tractor driver's seat or cab. The trailer is shown having four wheels, but the number of wheels is not critical. Rigidly and firmly fastened to the back of the trailer is a generally vertical rectangular and planar guide frame 3 with vertical sides which serve as guides for a moveable boom hitch bracket 4. The boom hitch bracket 4 is raised and lowered in the guide frame 3 by an hydraulic cylinder 50, (FIG. 2) or other suitable power source, carrying with it a boom hitch 5. Attached to the boom hitch 5 are two universal hinges 6 and 7 (FIG. 2) each hinge having a respective horizontal axis and the two hinges sharing and pivoting on a common vertical axis. The horizontal axes (not shown) are located at the inner ends of right and left inner boom sections respectively, and the common vertical axis is located at 8.

Returning to FIG. 1, the four section boom is made up of left inner boom section 9, left outer boom section 10, right inner boom section 11, and right outer boom section 12. The weight on the inner ends of the two inner boom sections is supported by the boom hitch 5. The weight on the outer end of the left inner boom section is supported on the ground, i.e. carried by wheel 13, which also carries the weight of the inner end of left outer boom section 10. Wheel 14 carries the weight of the distal end of this section. The weight of the right boom sections is similarly distributed between wheels 15 and 16. All four wheels 13, 14, 15, and 16 are mounted on and to carry respective wheel support frames, 13A, 14A, 15A, and 16A, more fully described with reference to FIGS. 9 and 10. These frames are moveably mounted in turn to carry the wheel mount brackets 13B, 14B, 15B, and 16B respectively, fastened rigidly to the respective booms. By simultaneously raising or lowering these brackets on the wheel support frames, the boom sections can simultaneously be raised or lowered to adjust their spraying height as will be explained later. Furthermore, the brackets on which frames 13A and 15A are mounted, each have a hinge permitting the respective frames and wheels to pivot with the bracket hinges on a vertical axis under control of respective wheel pivoting arms 17 and 18, as will be explained more fully later herein.

Pivoted on a transverse horizontal axis 19 which is proximate the lowest working elevation of the boom hitch and a distance in front thereof preferably near the midpoint of the length of the motive power source, is a rigid, inverted, and generally rectangular U-shaped member designated as a power fold arm 20. The power fold arm is pivotted on axis 19 by power means, for example one or more hydraulic cylinders, 27, conveniently mounted on and alongside the frame of the motive power source, in this case the tank trailer 2. The cylinder 27 pivots the power fold arm so that it oscillates between a forward position with the base of the U-shape in front of or towards the front of the motive power source, and a rearmost position, with the base of the U-shape in a position approximately vertically above the boom hitch 5. Attached near the two top corners of the inverted U-shaped fold arm are the inner ends of two elongated rigid brace members referred to as left and right boom pull braces 21 and 22 respectively. Attachment preferably is made by means of sliding collars equipped with friction latches (not shown), so that forward end portions of the rigid boom pull braces can slide through the collars for flexibility when the power fold arm is to be moved, but the forward end of the braces can be latched rigidly to the power fold arm when the booms are to be held rigidly in their extended or field position by the braces. The friction latches conveniently are arranged to engage when the power fold arm is moved to the extreme of its forward position by hydraulic cylinder 27, illustrated in FIG. 1, and to release the braces when the arm is moved out of this position.

The distal or back ends of the boom pull braces 21 and 22 are sliding collar pivots which can slide and turn on left and right slider bars 23 and 24 respectively, these slider bars being mounted rigidly on, and parallel to, portions of the respective inner boom sections 9 and 11. Latches (not shown) are provided at the outermost ends of the slider bars to retain the boom pull braces rigidly at these outermost ends of the bars when the booms are in field position, with provision being made to release the latches for sliding and for some desirable rotational movement of the braces on the booms when the latter are in field or in transport position or in transition between these.

Figure 3:
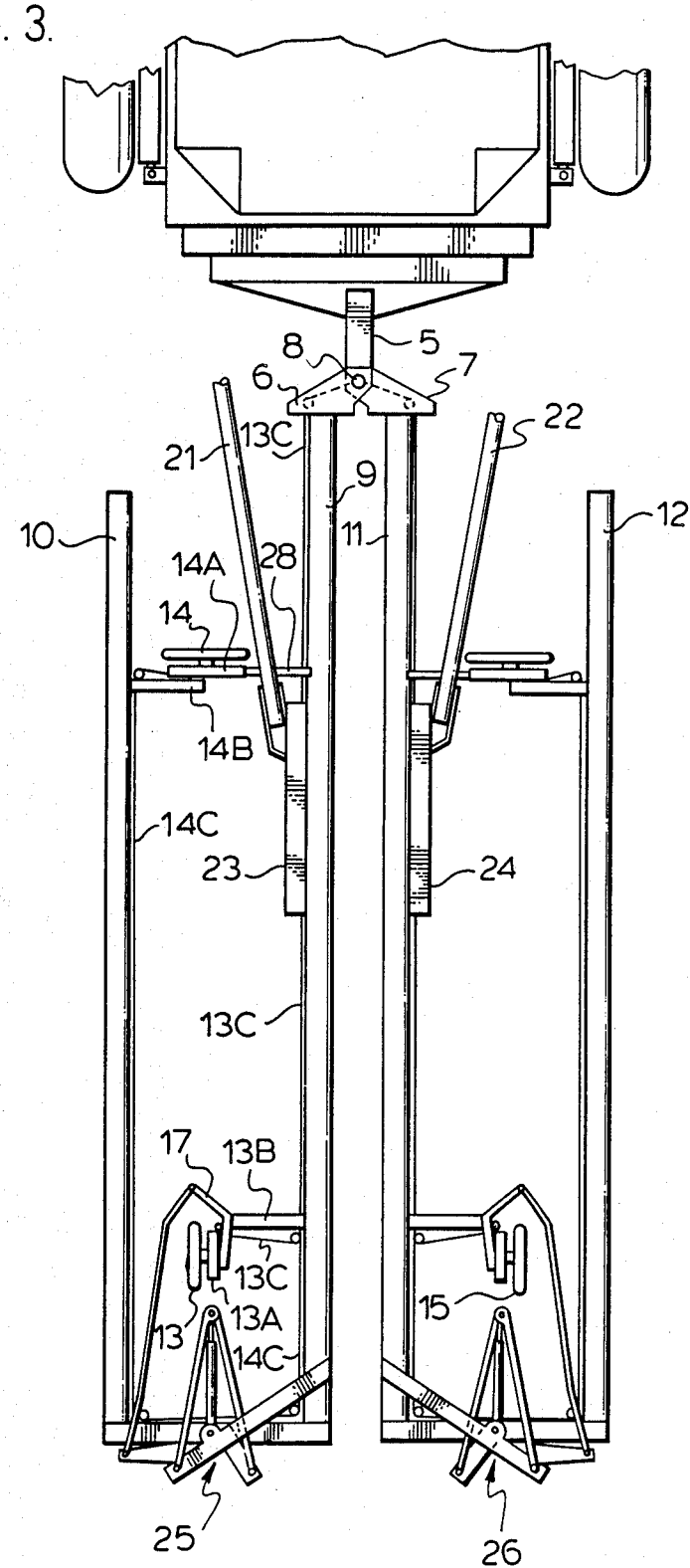
FIG. 3 is a schematic plan view of the four section boom of FIG. 1, omitting some parts, with the boom folded into the transport position.

Finally in FIG. 1 there are shown, in schematic form only, the four bar linkage mechanisms 25 and 26 which, with the outer boom fold cylinders, are capable of folding the outer boom sections 10 and 12 through 180 degrees to move them from relative positions beside and directly aligned with the inner boom sections 9 and 11 respectively as shown in FIG. 1, to positions adjacent and parallel to the inner boom sections as shown in FIG. 3. Before leaving FIG. 1 it can be noted that all four wheels, 13, 14, 15, and 16, carrying the major part of the weight of the booms and resting on the ground in the field position, have their axles parallel to the respective boom sections so that the line of the respective wheels is in the line of travel of the boom sections in field position. It can also be noted that the booms, extended in field position, are not in a single line but rather the left and right booms preferably form an angle centered at the boom hitch 5. Having the booms thus angled forward slightly from the boom hitch, when the equipment is in the working mode or field position, facilitates turning. The deviation of the booms in this manner from straight line alignment at the boom hitch does not have to be large, an angle between two and five degrees generally being adequate and effective; the angle shown in the figure is for illustrative purposes only.

In FIG. 3 showing the four boom sections folded into transport position, the weight of the inner ends of the inner boom sections 9 and 11 still is supported on the boom hitch 5 and the weight of the distal ends of these sections still is supported on the wheels 13 and 15, as is the weight of the adjacent inner ends of the outer boom sections 10 and 12, through the four bar linkage mechanisms 25 and 26 and the pivot pin 31 (FIG. 4) which links the sections. The weight of the outer end of the outer boom section 10 in transport position is lifted from wheel 14 and carried by a transport hook or bracket 28 securely fastened to inner boom 9, to engage under a coupler fastened to frame 14A when boom section 9 is raised after section 10 is rolled parallel to section 9. Raising boom hitch 5 thus raises the inner end of boom section 9 and simultaneously lifts wheel 14 from the ground, putting the weight of the outer end of boom 10 onto boom 9. Thus the entire weight of boom sections 9 and 10 in transport position is distributed between boom hitch 5 and wheel 13. By an identical arrangement, the weight of boom sections 11 and 12 is distributed between boom hitch 5 and wheel 15 in the transport position, there being a transport hook or bracket on section 11, corresponding to hook 28 on section 9, to engage the weight of the outer end of section 12 in transport position. It should be noted that wheel 13 is turned through an angle of substantially 90 degrees, relative to boom section 9, when boom section 10 is folded into transport position from field position. The wheel thus is aligned for travel in the same direction as the motive power source when the boom sections are folded for travel in the transport position. This turning is achieved through wheel pivotting arm 17, connected to the four bar linkage mechanism 25, as will be more fully explained later herein.

Figure 4:
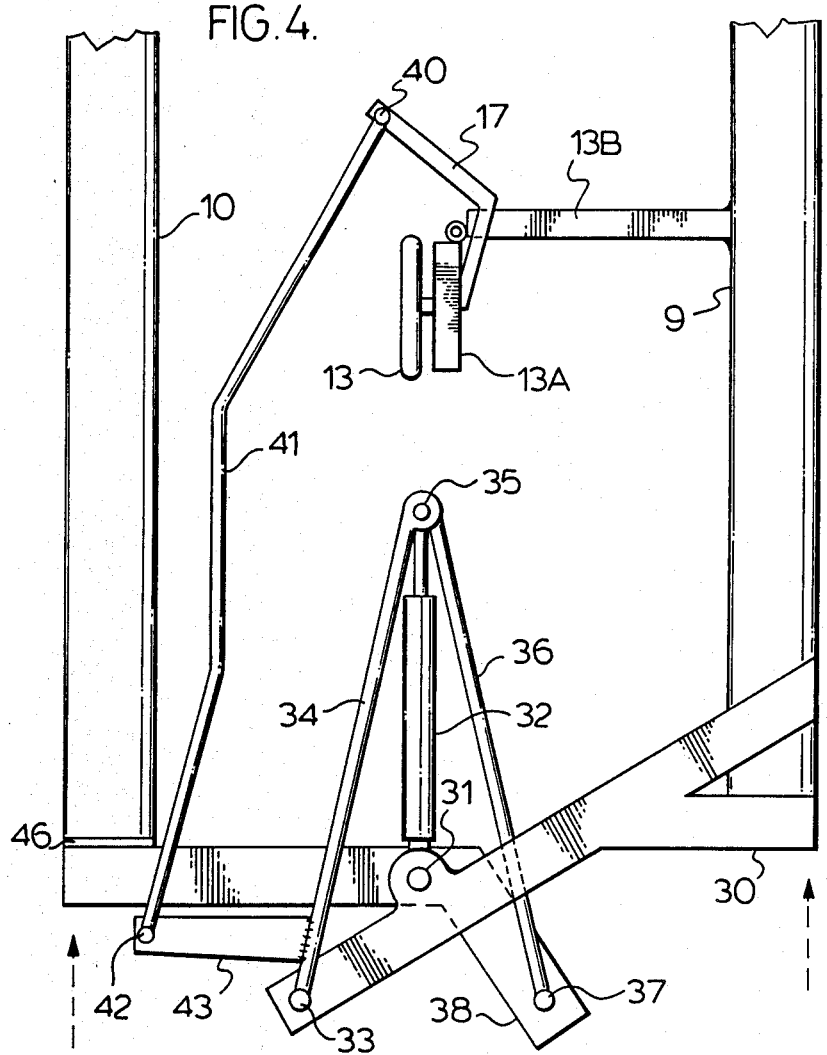
FIG. 4 is an enlarged plan view of the left four bar linkage system which connects the left inner and outer boom sections, in this figure the sections being held in the transportation mode or transport position.
Figure 5:
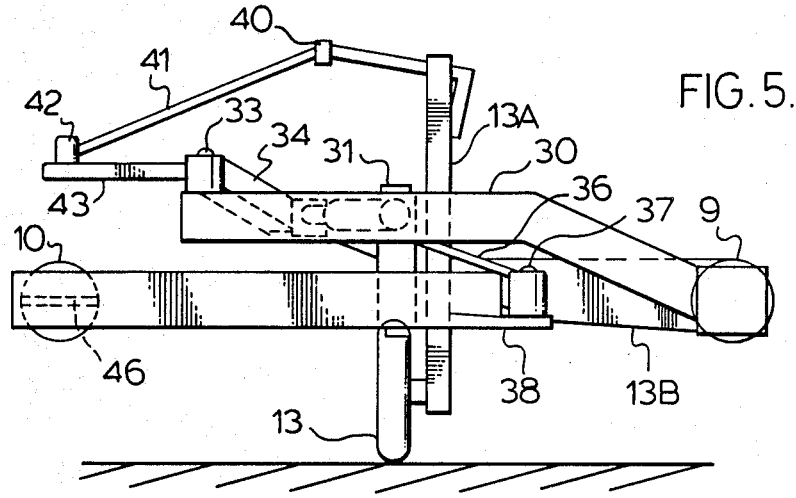
FIG. 5 is an elevation of the parts shown in FIG. 4, from the direction shown by the dotted arrows at the bottom of FIG. 4.
Figure 6:
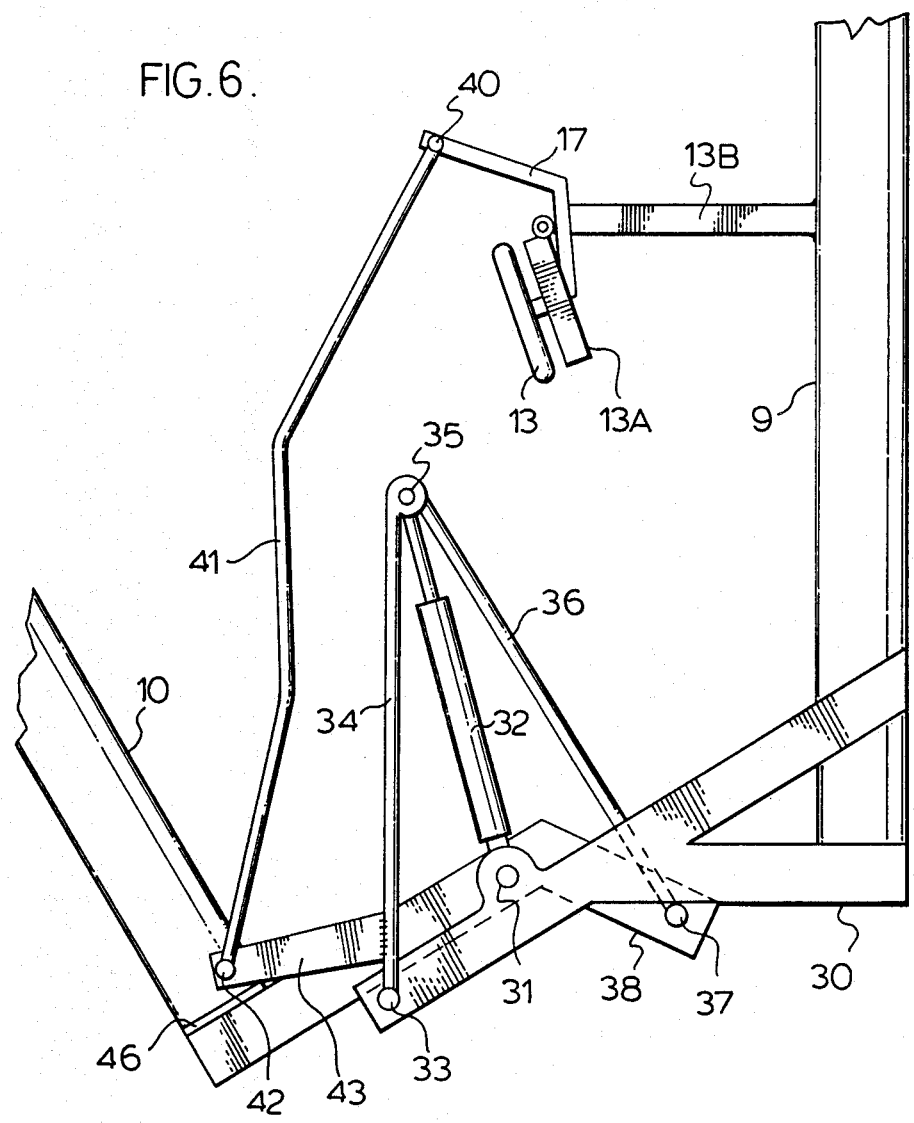
FIG. 6 is a plan view of the parts shown in FIG. 4 when they have been moved part way from the transport position to the field position.
Figure 7:
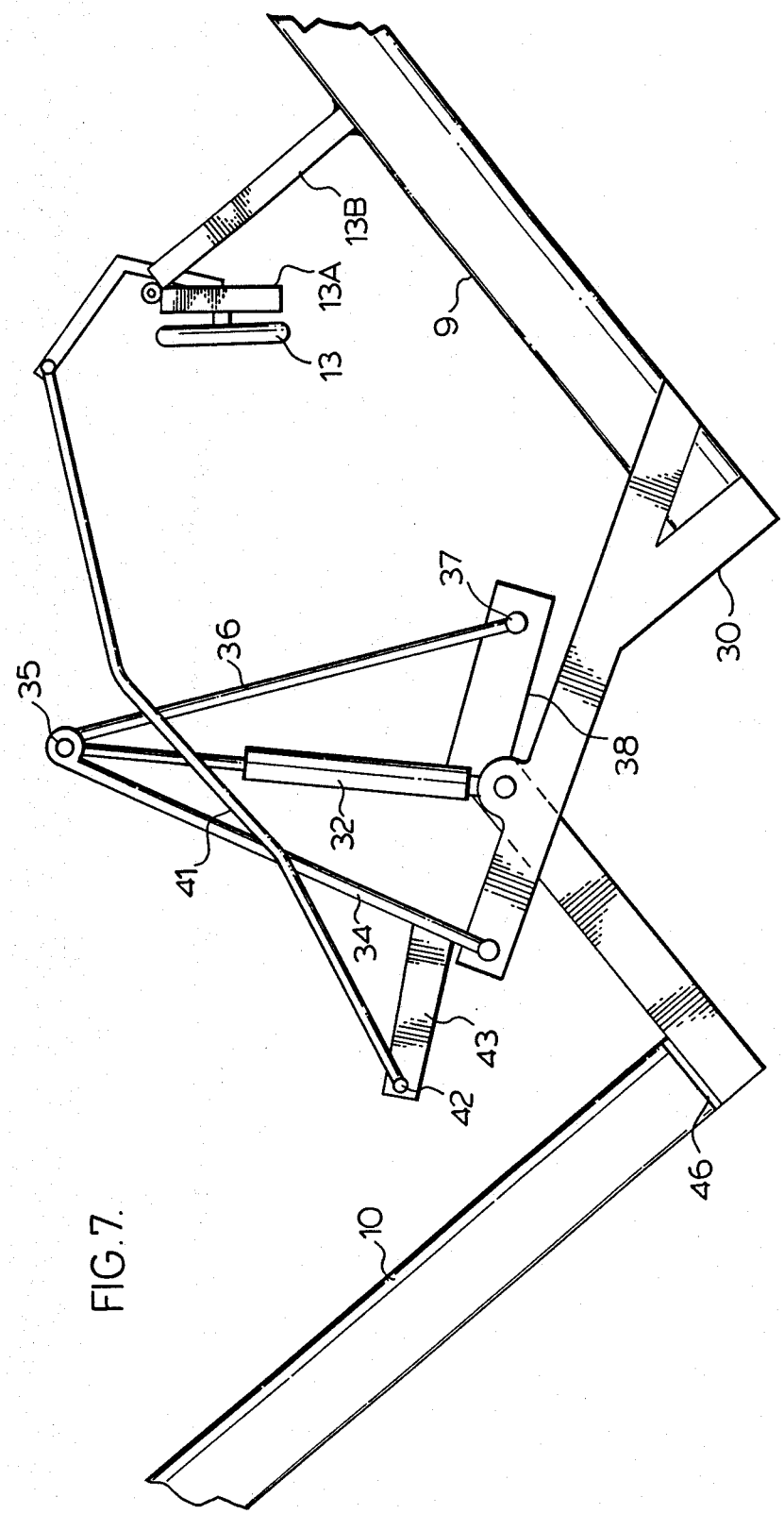
FIG. 7 is a plan view of some of the parts of FIG. 6 when they have moved still further from the transport position to the field position or working mode.

FIGS. 4 and 5 show plan and back elevation views of the left boom sections 9 and 10 when they are folded into transport position. From FIG. 5 it is clear that the main structural members of the boom sections are cylindrical tubing, which is preferred over rectangular or square cross sectional tubing for a variety of reasons, primarily a combination of ease of fabrication and high strength-weight ratio, particularly with regard to torsional strength of the main structural members over long spans. The enlarged detail of these figures shows that boom section 9 at its outer or distal end has firmly fastened thereto, e.g. by welding, a first rigid bar member 30 which is preferably bifurcated as shown, for better rigidity, and is bent to extend a small distance beyond the distal end of boom section 9 and to one side thereof in the direction adjoining boom section 10. FIG. 5 shows also that bar member 30 extends to and above the level of the upper half of the end of boom section 9. Securely fastened in a protrusion or boss on the inner side of bar member 30 at an appropriate distance from the end of the member 30, is a vertical pivot pin 31 to which is attached the base of an hydraulic cylinder 32. Pivotally attached close to the end of member 30 by means of pivot pin 33 spaced at an appropriate distance from pin 31, is the base of a first rigid cylinder link bar 34 which pivots on pin 33. The distal end of link bar 34 is pivottally attached to the top of the hydraulic cylinder 32 by pivot pin 35. As hydraulic cylinder 32 is extended or contracted, it causes the hydraulic cylinder 32 and link bar 34 to pivot on pins 31 and 33 respectively as the relative links of link bar 34 and cylinder 32 change. Also pivotally attached to the top of cylinder 32 by pin 35 is the base of a second rigid cylinder link bar 36, which extends back under first rigid bar member 30 and pivotally attaches at its distal end by means of pivot pin 37 to one end of a second right bar member 38. Bar member 38 pivots on pin 31 by which it attached pivotally to bar 30; like bar member 30, bar member 38 is bent at an angle in a horizontal plane, generally as shown in the plan view of FIG. 4 and extends, when in the transport position, from its base end at a location behind bar member 30 to become generally aligned with a portion of bar member 30 transverse to the parallel alignment of boom sections 9 and 10. The inner end of outer boom section 10 is hingedly attached to the side of bar member 38 at the distal end thereof on a hinge axis 46 that is horizontal and transverse to the boom section 10, which extends forward subtantially at right angles from the end of bar member 38.

Figure 8:
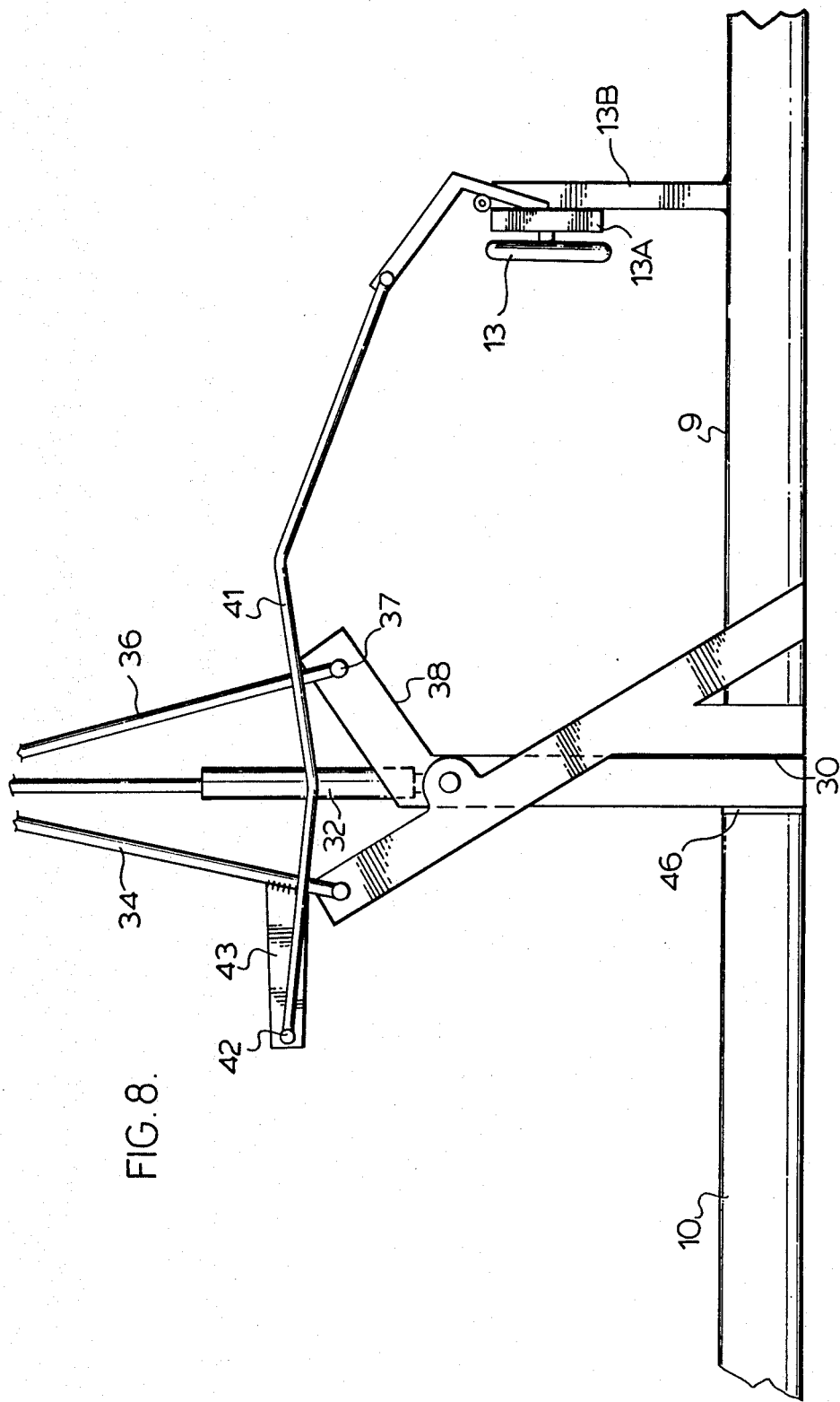
FIG. 8 is a plan view of the parts shown in FIG. 7 when they have moved completely into the relative positions they have in the working mode.

FIGS. 4, 6, 7, and 8 illustrate the relative positions of hydraulic cylinder 32, the two rigid bar members 30 and 38, and the two cylinder link bars 34 and 36, as the hyraulic cylinder is extended from its minimum extension condition, which maintains the boom sections 9 and 10 in the transport mode shown in Figure 4, to its maximum extension condition, which maintains the boom sections in the working mode as shown in FIG. 8 and FIG. 1.

It has been indicated previously herein that inner boom wheel 13 (and its wheel frame 13A) are turned through 90 degrees when the corresponding outer boom section is moved between field position and transport position. The mechanism provided for this will now be explained, with reference to FIGS. 4 to 8. Previously mentioned wheel pivotting arm 17 is rigidly fastened to wheel support frame 13A which in turn is vertically moveably and horizontally pivotally fastened to wheel mount bracket 13B. Pivotally fastened to the distal end of arm 17 by another vertical pin 40 is one end of bent lever steering link 41. The distal end of steering link 41 is pivotally fastened, by another vertical pin 42, to the outer end of a steering arm 43 which, at its base, is fastened rigidly to link bar 34 and rotates therewith on pivot pin 33. From the position of arm 17, frame 13A and wheel 13 relative to wheel mount bracket 13B in FIGS. 4 and 6, it can be seen that continued rotation of link bar 34 on pivot pin 33 to the position shown in FIG. 8, which rotation moves cylinder 32 through substantially 90 degrees from FIG. 4 to FIG. 8, also moves wheel 13 from its transport position parallel to the boom in FIG. 4, through substantially 90 degrees, to its field position at right angles to the boom when link bar 34 and steering link 41 are in the position shown in FIG. 8. In a similar manner, wheel 15 supporting the outer end of right inner boom section 11 is turned through an angle of substantially 90 degrees between its field position, shown in FIG. 1, and its transport position, parallel to the boom sections shown in FIG. 3, when right four bar mechanism 26 operates to fold and unfold right boom sections 11 and 12 between field position and transport position.

In the lens comprehensive embodiments of the invention having only two main boom sections, there is no requirement for the four bar linkage mechanism to join inner and outer boom sections, but it is still required that the wheels supporting the outer ends of the two main boom sections be pivotted through substantially 90 degrees between working position and transport position. This requirement is met simply by having a power operated wheel pivoting means, e.g. an hydraulic cylinder equivalent to cylinder 32 associated wtih the four bar linkage mechanism, directly connected between, for example, a main boom section or a wheel mount bracket, and the associated wheel support frame and associated wheel carrying it, and adapted to pivot the wheel support frame between working and transport position.

Mention has been made earlier herein of the boom hitch bracket 4 (FIG. 2), which moves vertically between the vertical sides of guide frame 3, to raise and lower the boom hitch 5 and the inner ends of the two inner boom sections. Vertical movement of the inner ends of the inner boom sections also achieves corresponding movement of the rest of the boom in a simple manner, so that the boom sections are maintained generally parallel to the ground as will now be explained. To achieve this, the vertical distances on the wheel support frames 13A, 14A, 15A, and 16A to which the respective wheel mount brackets are raised or lowered, must correspond to the vertical distance to which the boom hitch bracket 4 is raised or lowered in guide frame 3. For each inner boom section, a cable is securely fastened by one end to the guide frame 3 or other fixed point on the motive power source near the boom hitch 5. The left cable 13C (FIG. 3) for example, passes from the point of fastening, through hollow vertical axis 8 on boom hitch 5, over appropriately placed pulleys on universal hinge 6, along beside inner boom section 9 to pulleys on the wheel mount bracket 13B and up to the wheel support frame 13A, to which the other end of the cable is securely fastened in taut condition at or near the top thereof, above the level of the boom. With the cable thus tensioned, when the boom hitch 5 is raised from its lowermost position by its hydraulic cylinder (not shown), with the inner boom section 9 parallel to the ground and the wheel mount bracket 13B supported in its lowermost position on wheel support frame 13A by the cable fastened to the top of frame 13A, the distal end of inner boom section 9 also is raised an equal distance on wheel support frame 13A to maintain boom section 9 parallel to the ground as the taut cable passes over the pulleys to raise wheel mount bracket 13B relative to wheel support frame 13A. A second cable 14C (FIG. 3) is employed to raise the distal end of outer boom section 10 in a similar manner. Instead of being fastened at one end to or near the motive power source, this second cable can be spliced or clamped to the first cable at a convenient point, e.g. along inner boom section 9 near the wheel mount bracket 13B. From its attachment point to the first cable, the second cable passes over appropriate pulleys, along beside the outer boom section 10, to pulleys on wheel mount bracket 14B and up to the wheel support frame 14A, to which the end of the cable is securely fastened in taut condition at or near the top thereof. The second cable moves in conjunction with the first, so that when the first cable is pulled by raising the boom hitch to raise the inner boom section 9, the second cable also is pulled to raise the distal end of the outer boom section 10 on the wheel support frame 14A. In this manner the entire length of the boom is maintained parallel to the ground as it is raised or lowered by raising or lowering the boom hitch on the motive power source, whether the boom is extended in working (field) position or folded into transport position.

Explanation will now be made of the procedure for converting the field sprayer frame of the invention from the transport position, illustrated in FIG. 3, to the full field position shown in FIG. 1.

To begin the conversion, the sprayer boom sections 9, 10, 11, and 12 are lowered so that all four wheels 13, 14, 15, and 16 are in contact with the ground. (For transport, the boom sections are raised on wheel support frames 13A, 14A, 15A, and 16A, so that transport hook 28 on boom section 9 engages and lifts a coupler 45 (FIG. 10) on wheel support frame 14A and lifts wheel 14 clear of the ground; a similar transport hook on bottom 11 similarly lifts wheel 16 clear of the ground.) The hydraulic cylinder 32 in left four bar linkage mechanism 25, and the corresponding cylinder for mechanism 26, are then extended. By such extension, the mechanisms move outer boom sections 10 and 12, as illustrated by the sequence of FIGS. 4, 6, 7, and 8, through 180 degrees from position shown in FIG. 3, i.e. parallel to boom section 9 and 11 respectively, to positions in adjacent end alignment with them, as they are in field position. At the same time, the mechanisms move wheel pivoting arms 17 and 18 and turn the direction of the wheels of the inner boom sections through substantially 90 degrees, as also explained above with reference to FIGS. 4, 6, 7, and 8. The outer boom sections are easily moved between these positions, as they roll readily on the ground on wheels 14 and 16, boom section 10 pivoting about pivot pin 31 from a relative position shown in FIG. 4 to a relative position shown in FIG. 8. With the boom sections thus longitudinally aligned directly behind the motive power source, the power fold arm 20 is in the location pivoted to its rearmost position, where it remains during transport with its base above boom hitch 5, and the distal ends of boom pull braces 21 and 22 are moving freely between the ends of slider bars 23 and 24 respectively. With the boom pull braces thus positioned, power fold arm 20 is pivoted, by its associated hydraulic cylinder 27, from its rearmost position to near its ultimate forward position. In so pivoting, it pulls on the boom pull braces 21 and 22 which cause the left and right booms to pivot on axis 8 of the universal hinges 6 and 7 respectively and rolls the boom sections on their respective wheels, part way around to the field position. From its forward position, with the boom sections moved only part way to field position, the power fold arm is pivoted back to its rearmost position; this causes the distal ends of the boom pull braces 21 and 22 to slide backwards, to the ends of slider bars 23 and 24, respectively, remote from boom hitch 5. There the braces engage latches previously referred to, to maintain the ends of the braces at the outermost ends of the slider bars. Power fold arm 20 then is again pivoted forward, this time to its extreme or ultimate forward position, which engages the friction latches previously referred to, to hold the forward ends of the braces rigidly to the power fold arm. This second pivoting movement of the power fold arm pulls on the rigid braces and causes the left and right booms to pivot further on axis 8 and rolls them the rest of the way around to field position which is illustrated in FIG. 1. The braces are both latched at each end, and retain the booms at the desired angle with reference to the direction of travel of the motive power source; the left and right booms are not necessariy aligned in a straight line with each other, as previously mentioned regarding the field position, but the rigid braces hold them at the desired angle regardless of the effect of gravity on slopes tending to advance or retard the positions of the booms with respect to the motive power source. In this position, the sprayer is ready to commence spraying operations.

When a spraying operation has been completed and it is desired to return the sprayer to the transport position, the following prodedure is followed. First, the power fold arm 20 is pivoted from its extreme forward position to its rearmost position. As it leaves its extreme forward position, the friction latches at the forward ends of the boom pull braces are released, permitting the braces to slide through the sliding collars attaching them to the power fold arm and allowing the latter to pivot backwards without exerting force on the braces or moving the booms to which the distal ends of the braces are still rigidly attached. Next, boom hitch 5 is lowered to its lowest point, thus lowering the booms to their lowest level on the wheel support frames. With the booms at their lowest level, the hydraulic cylinders in the four bar linkage mechanisms 25 and 26 are retracted. Retraction causes the mechanisms to move the outer boom sections, from their positions aligned with the inner boom sections at the outer end thereof to positions parallel to and alongside the inner boom sections as they are in transport position. At the same time, the retraction of the hydraulic cylinders moves the wheel pivoting arms 17 and 18 and turns the directions of the wheels of the inner boom sections through substantially 90 degrees, as explained with reference to FIGS. 4, 6, 7, and 8. Conveniently also, this turning of the wheels activates a release mechanism, for example a simple connector cable, which unlatches the distal ends of the boom pull braces 21 and 22 from the outermost ends of slider bars 23 and 24 respectively. The distal ends of the braces then are free to slide along the slider bars, the forward ends of the braces also are free to slide through their attachment to the power fold arm, and there is adequate freedom of movement between the braces and the booms to permit the booms to fold back behind the motive power source in full transport position. Next, the boom hitch is raised from its lowest point to a convenient height for transport, generally close to the top level of the adjustable boom hitch bracket height but in any event, high enough so that the transport hooks on the inner boom sections (eg. 28 in FIG. 3) engage the wheel support frames of the couplers, e.g. 45 (FIG. 10) on corresponding outer boom sections and lift the wheels of the outer boom sections off the ground. The motive power source can then be driven forward and the folded boom sections will trail in behind in alignment with the motive power source, trailering on the two inner boom section wheels in the configuration of FIG. 3, the transport position.

FIGS. 9 and 10 illustrate, in front and side views, a preferred arrangement for mounting of wheel 14 on wheel support frame 14A and for moveably mounting 14A in turn in wheel mount bracket 14B. Wheel 14 rests on the ground, in working position, with its axle held by support frame 14A. This frame preferably has a trapezoidal shape as shown, with a spring and toggle pivot arrangement at one corner by the axle, to act as a shock absorber. One parallel side of the trapezoidal shape is aligned vertically above the axle and shock absorbing spring; the other parallel and vertical side of the trapezoid is held in a vertical position between a set of three rollers 44, 44A and 44B which straddle the side of the frame and form an isosceles triangle having its base parallel to the frame side. These three rollers have their axles mounted in wheel mount bracket 14B. The distal end of cable 14C is attached to wheel support frame 14A near the top thereof, and passes downwardly, over a pulley on the end of wheel mount bracket 14B to another pulley near tubular boom section 10 along which the cable runs parallel to join to cable 13C (FIG. 3). Pull on cable 14C by cable 13C causes wheel mount bracket 14B to rise on support frame 14A, the parallel sides of frame 14A being held in a vertical position by the rollers 44, 44A and 44B retaining one of the sides vertically while allowing the wheel mount bracket 14B to rise and fall on the frame as cable 14C is taunted and slackened. Wheel support frame 13A has the same configuration as frame 14A, but wheel mount bracket 13B differs from bracket 14B in having a hinge which enables wheel support frame 13A to pivot substantially 90 degrees on the axis of the hinge and permits wheel 13 to turn through substantially 90 degrees, for conversion of the sprayer frame between working and transport position as previously described. Wheels 15 and 16 and their associated support frames and mount brackets are identical to but mirror images of corresponding wheels 13 and 14 and associated parts.

The vertical adjustment possible for the height of the boom hitch bracket 4 in guide frame 3 and the wheel mount brackets on their wheel support frames preferrably is made large enough so that the height of the boom sections above ground level can be varied to appropriate spraying height for both pre-emergent spraying of fields and full crop height spraying. Generally this can be achieved conveniently with adjustments of the boom height above ground between one and three feet (0.3 to 0.9 meters), although maximums of four feet (1.2 meters) may sometimes be desired. The sprayer frame of the present invention, by raising the entire boom height to adjust spraying height, thus can be used on full grown crops; this is generally not possible on sprayers whose spray height is adjusted by raising and lowering a sprayer boom alongside a main boom at a fixed height above ground to obtain adjustment of spraying height.

A particularly significant advantage achieved by adjustment of complete boom height to obtain variation in spraying height is that it is possible to use wind screens on the boom at all spraying heights. The use of wind screens to protect sprayed liquid from spraying in high wind spray application conditions is known, but has been restricted, when using fixed boom height sprayers, to spraying crops of limited height considerably less than the boom height, because of the allowance that must be made for the length of the wind screen below the boom. Although this restriction is applicable in all uses of wind screens on spray booms, it is much less significant on sprayers whose entire boom height can be raised to clear the height of relatively tall crops.

Mention has been made herein of various hydraulic cylinders used to power movement of various parts, i.e. the moveable boom hitch bracket, the power fold arm, and the four bar linkage mechanisms which fold the outer boom sections around the inner boom sections. While separate hydraulic power sources and circuits can be used to operate each of these hydraulic cylinders, it is not essential to have them separate, and conventional hydraulic cross-over valves can be used to switch hydraulic power from one power source to different hydraulic cylinder circuits to actuate the appropriate hydraulic cylinders as required.

Although no mention has been made herein regarding the transfer and distribution of liquid to be sprayed, from the resevoir thereof on the motive power source to individual spray jets positioned along the length of the booms, this can all be achieved by conventional means securely fastened to the motive power source or to the boom sections, provision being made for flexible connections between articulating rigid parts, as is conventionally done. Furthermore it should be noted here that the sprayer frame of this invention is suitable as well for pneumatic spraying of powders and dusts, the liquid pump, liquid lines, and spray jets being replaced by compressor, pneumatic lines, and suitable powder dispersing pneumatic jets.

Mention has been made earlier herein of the preferred form of the main structural members of the boom sections, viz: cylindrical tubing. Such tubing is readily fabricated from two semi-cylindrical halves having lips along their longitudinal edges which can be rivetted or preferrably welded together to form the hollowing tubing; the semi-cylindrical halves are readily formed from sheet steel, for example of 14 to 18 gauge thickness (1.91 to 1.22 mm). Tubing of six inch diameter made of 16 gauge (1.57 mm thickness) steel sheet, weighing 4.5 pound per linear foot, has ample structural strength for lengths of 20 to over 30 feet (6 to 10 meters) for use in the sprayer frame of the present invention, and furthermore has almost three times the torsional strength of comparable 3.5 inch (89 mm) square cross section tubing having wall thickness of 0.125 inch (3.18 mm) and weighing 5.6 pounds per linear foot.

An optional feature of the invention is a boom end trip section. Such a section is preferrably in the form of a relatively short (e.g. one to two meters or three to six feet) length of boom tubing hingedly attached in longitudinal alignment with the outer end of an outer boom section and held in alignment by a light releasable friction held spring trip latch. The hinge has an axis that is inclined from the vertical, by about 10 to 20 degrees, in the direction of normal forward motion of the boom. When the advancing trip section inadvertently comes up against a post or other obstruction it can fold back and slightly upwards on the axis of its hinge by forcing open the trip latch, and permit the whole boom to continue in forward motion past the post or other obstruction without damage to the boom. While the trip section is held against the obstruction as the boom passes thereby, the trip section rises in the air slightly because of the forward inclination of its axis. Once it has passed the post and is no longer held out of alignment with the rest of the boom, the trip section folds forward on its hinge due to its own weight and resumes its latched position in longitudinal alignment with the rest of the boom.

Numerous modifications can be made in the various expedients described without departing from the invention, the scope of which is defined in the following claims.

What is claimed is:

1. A frame for a field sprayer that is foldable to a narrow width transportation mode and extendable to a broad width working mode for wide swath application of spray from nozzles mounted thereon, the folding and extension of the frame being operable from a position at the controls of a motive power source serving to pull the sprayer, said frame comprising:

(a) a vertical planar rectangular guide frame mounted rigidly at the back of said motive power source,
(b) a moveable boom hitch bracket mounted in said guide frame and adapted to move only vertically but freely therein,
(c) a power source adapted to move and position said boom hitch bracket in said guide frame, operable from the controls of said motive power source,
(d) a boom hitch rigidly attached to said boom hitch bracket, adapted to move vertically with said bracket and to support and pull the inner ends of elongated boom sections of the sprayer frame,
(e) two universal hinges mounted on said boom hitch, each adapted to pivot on a common vertical axis and each adapted to attach, through separate pivots on horizontal axes, to a respective inner end of an elongated boom section,
(f) two elongated main boom sections, each attached by its inner end to a respective one of said universal hinges to pivot in a horizontal plane around the vertical axis of its hinge and to pivot in a vertical plane around the horizontal axis of its hinge,
(g) two wheel mount brackets, each rigidly fastened to a respective boom section near the outer end thereof, each having a distal end section hinged thereto on a verical axis,
(h) two wheel support frames each associated with a respective wheel mount bracket, moveably mounted in the hinged distal end section of its respective bracket, and held in vertical relative position with reference thereto by first taut cable means having one end fastened to a fixed point by the bottom of said guide frame, said cable means passing over pulley means to extend past the associated universal hinge, along the associated boom section, wheel mount bracket, and upwardly to the associated wheel support frame to which its distal end is fastened near the top thereof, above the level of the boom section, (i) wheel means each with an axle in the base of a respective wheel support frame, maintaining the wheel means aligned with the support frame, (j) power operated wheel pivoting means pivotally connected between each wheel support frame and associated boom section and adapted to pivot the associated wheel and support frame between positions respectively parallel to and normal to the boom section on the hinge axis of the hinged distal end section of the associated wheel mount bracket, (k) a rigid inverted U-shaped member pivoted at its lower extremities on a horizontal axis which is positioned parallel to said planar guide frame at an elevation proximate the lowest operating level of said boom hitch and proximate the midpoint of the length of said motive power source, said member being adapted to pivot so that its upper extremity oscillates between a forward position proximate the front of said motive power source and a rearmost position approximately vertically above said boom hitch, (l) power means to pivot said U-shaped member between said forward and rearmost positions, and (m) an elongated rigid brace member associated with each said elogated boom sections, each brace member extending from a respective point of attachment of its forward end near the upper extremity of said U-shaped member to a respective point of attachment of its distal end near the outer end of its associated boom section, said forward end being longitudinally moveably attached to said U-shaped member and adapted to releasably latch relative to its point of attachment, said distal end being attached to said boom section by means adapted to permit movement of said distal end along a portion of the length of said boom section and to latch it releasably at the outermost extremity of said movement.

2. A frame for a field sprayer as claimed in claim 1, and further comprising:

(a) two elongated outer boom sections, each pivotally attached by its inner end to the outer end of a respective one of said main boom sections by a respective four bar linkage mechanism adapted to pivot its associated outer boom section through 180 degrees between a position in contiguous direct alignment with its associated main boom section and a position parallel to and adjacent the associated main boom section, (b) two outer boom wheel mount brackets, each rigidly fastened to a respective outer boom section near the outer end thereof, (c) two outer boom wheel support frames, each associated with a respective wheel mount bracket on an outer boom section, moveably mounted for vertical movement with respect thereto and held in vertical relative position with reference thereto by second taut cable means, said second cable means having one end fastened to said first taut cable means adjacent its respective main boom section and passing over pulley means to extend along said main boom section, past said four bar linkage mechanism, along said outer boom section and wheel mount bracket, and upwardly to the associated wheel support frame to which its distal end is fastened near the top thereof, above the level of the outer boom section, (d) wheel means each with an axle in the base of a respective one of said outer boom wheel support frames, and (e) two transport brackets, each securely fastened to a respective main boom section and adapted to engage under the associated wheel support frame of the corresponding outer boom section when said section is adjacent and parallel to said main boom section in its lowermost position, and to raise the wheel means of said associated wheel support frame clear of the ground when said booms are raised on the wheel support frames by raising said boom hitch bracket.

3. A frame for a field sprayer as claimed in claim 1 in which each power means in an hydraulic cylinder.

4. A frame for a field sprayer as claimed in claim 2 in which the main boom sections and the outer boom sections are made from cylindrical tubing each fabricated from two semi-cylindrical sheet steel halves having lips along their longitudinal edges which are welded together to form hollow tubing.

5. A frame as claimed in claim 4 and further including a boom end trip section of boom tubing on the outer end of each outer boom section in longitudinal alignment therewith and hingedly attached thereto on a hinge axis that is inclined forward from the vertical between 10 and 20 degrees, the trip section being held in longitudinal alignment by a light releasable friction held spring trip latch.

* * * * *